United States Patent [19]
Regan

[11] Patent Number: 4,722,645
[45] Date of Patent: Feb. 2, 1988

[54] ROTATABLE SPINDLE AND TOOL HOLDING ADAPTER

[75] Inventor: Donald J. Regan, Farmington Hills, Mich.

[73] Assignee: NO-MA Engineering Incorporated, Farmington Hills, Mich.

[21] Appl. No.: 936,052

[22] Filed: Nov. 28, 1986

[51] Int. Cl.⁴ ............................................. B23B 31/44
[52] U.S. Cl. ................................ 408/239 A; 279/1 A; 279/91
[58] Field of Search ...................... 279/1 A, 1 B, 7, 91, 279/97, 99–101; 408/239 R, 239 A

[56] References Cited

U.S. PATENT DOCUMENTS 2,709,600  5/1955  Lehde ............................. 279/1 A X
2,717,791  9/1955  Packer .................................. 279/91

FOREIGN PATENT DOCUMENTS 102404  8/1941  Sweden ................................. 279/91
128003  6/1919  United Kingdom ................... 279/91

Primary Examiner—Gil Weidenfeld
Assistant Examiner—Steve Bishop
Attorney, Agent, or Firm—Neal A. Waldrop; Jay C. Taylor

[57] ABSTRACT

A power driven rotatable spindle is provided with a conical recess tapering inwardly from one end of the spindle to receive a mating conical shaft of a tool holding adapter at a coaxial operative position whereat the spindle and adapter are splined for rotation as a unit. The adapter is moved axially to and from the operative position by interengageable screw threaded portions of the adapter and collar, which latter is rotatable but not axially movable on the spindle.

12 Claims, 7 Drawing Figures

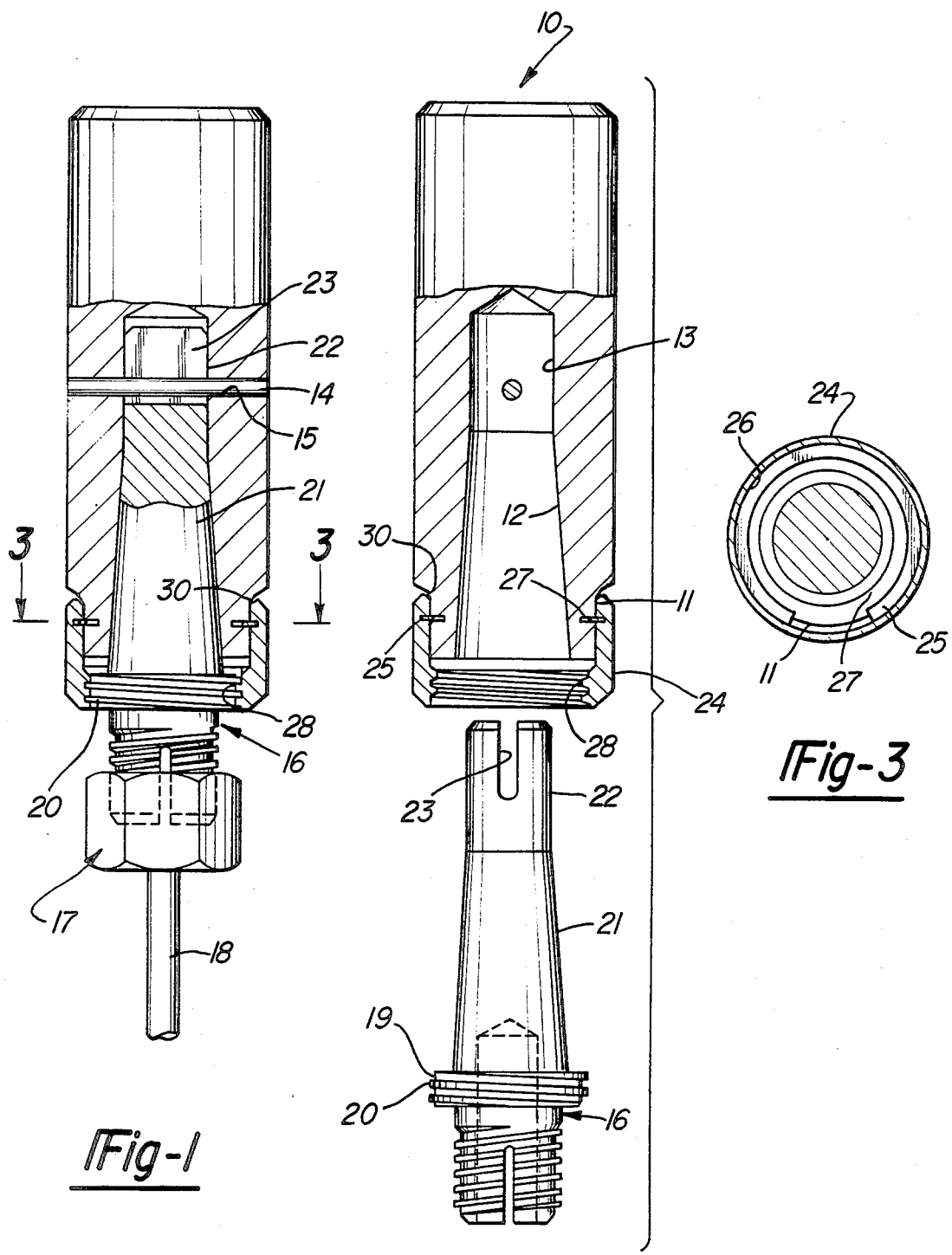

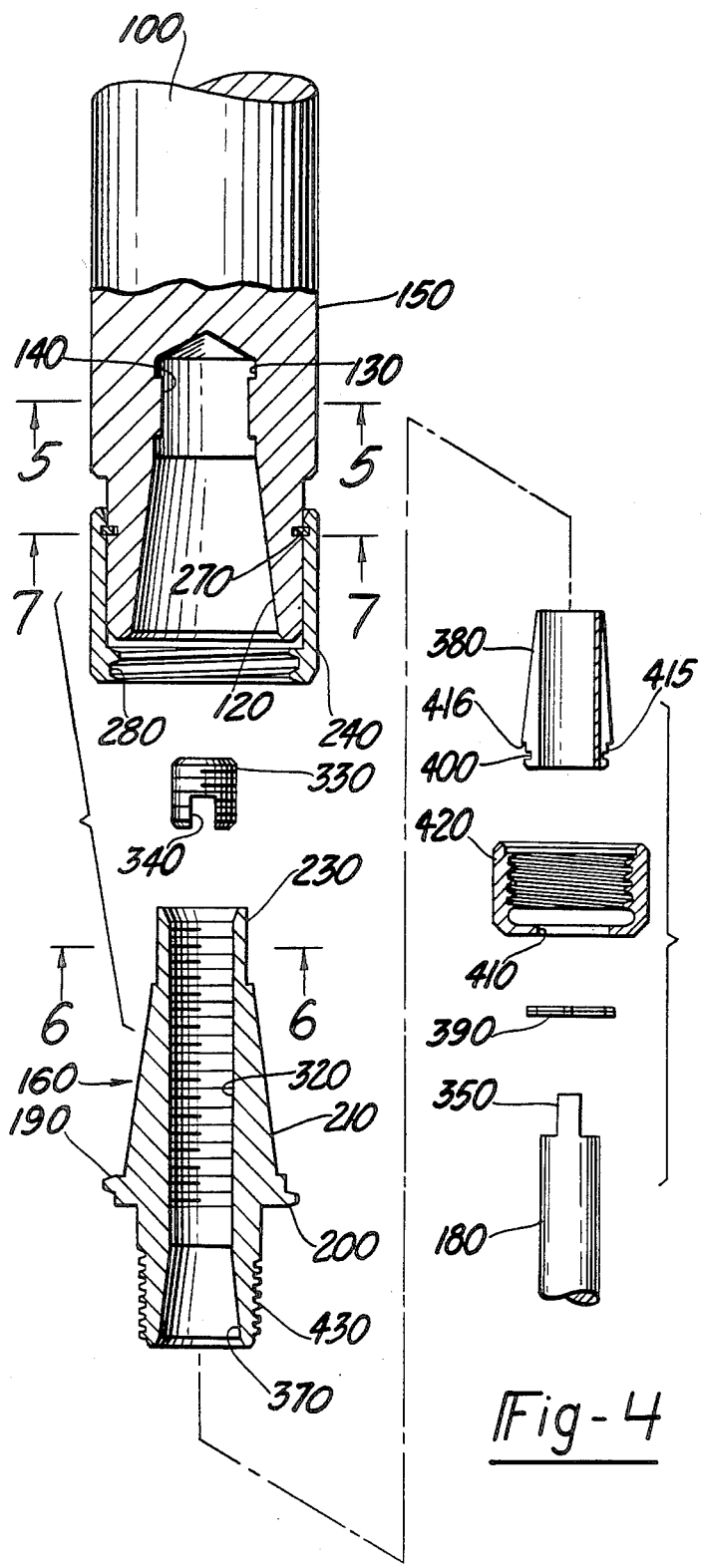
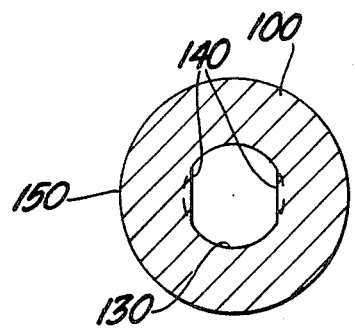
Fig-5
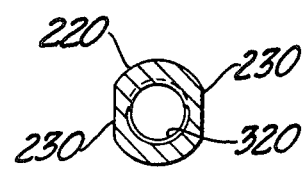
Fig-6
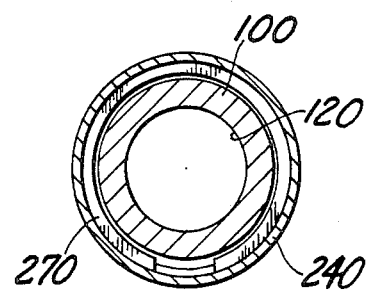
Fig-7

ROTATABLE SPINDLE AND TOOL HOLDING ADAPTER

The present invention relates to improved means for securing a tool holder or tool holding adapter to a rotatable power driven spindle or drive mechanism for the adapter.

BACKGROUND AND OBJECTS OF THE INVENTION

A common machine tool arrangement employed in the mass production of various articles wherein drilling, boring, reaming, grinding, and similar operations involve a rotating tool comprises a tool holding adapter removably attachable to a power driven spindle. Heretofore a complex latch mechanism has been required to hold the adapter and spindle in operative engagement with each other, often including radially extending lugs of the adapter interfitting and retained in place within recesses in the spindle by means of a trigger pin and compression spring mechanism. Such assemblies are not only complicated to use and expensive to manufacture, but are also subject to jamming when small chips get into the latch mechanism, as for example during extensive use. In such instances, removal of the tool holding adapter from the spindle is often difficult. Also if the latch mechanism involves radial lugs, small diameter assemblies are not feasible, and because of the large diameter of such assemblies, they cannot be used with closely spaced spindles in multiple spindle machines.

Important objects of the present invention are to provide an improved mechanism of comparatively simple and economical construction for releasably securing a tool holding adapter to a power driven spindle; wherein the adapter can be quickly attached in an operative position to the spindle, or quickly released, usually by finger manipulation; wherein the latch mechanism for attaching and releasing the adapter relative to the spindle is at all times shielded from particles of dirt, grindings, chips and the like; wherein a positive rotary drive mechanism between the spindle and adapter is completely independent of the latch mechanism; and wherein the outer diameter of the overall latch mechanism can if desired be no greater than the corresponding diameter of the spindle, thereby rendering the mechanism of the present invention especially suitable for use with multiple spindle machines or in small diameter applications.

Another object of the invention is to provide a tool holding adapter having a conically tapered shaft dimensioned to seat within a mating conically tapered opening extending coaxially into the forward end of a power driven spindle. A retention and rejection collar rotatable coaxially on a reduced diameter forward end of the spindle, but not movable axially relative to the spindle, is provided with an internally threaded portion in screw threaded engagement with an externally threaded portion of the adapter, whereby upon rotation of the collar in one direction or the other, the tapered shaft of the adapter is moved axially into or out of its seated position within the tapered spindle opening. A spline engagement between the spindle structure and adapter at the seated position provides a positive drive (independent of the latch mechanism) for rotating the adapter upon rotation of the spindle. Also the threaded connection between the collar and adapter is preferably arranged so that rotation of the collar in the direction for moving the adapter to the seated position is opposite the rotational direction of the spindle during operation of the tool.

Other and more specific objects are to provide the threaded connection between the collar and adapter with an acme type thread dimensioned to move the adapter from its seated position to a position out of engagement with the collar upon approximately a single full turn of the collar; to provide effective means for retaining the collar against axial movement along the spindle while enabling freedom of rotation comprising a resilient C-type ring having inner and outer peripheral portions confined respectively within confronting coaxial annular grooves in the outer periphery of the reduced diameter portion of the spindle and an overlying inner cylindrical surface of the collar; and to provide the adapter with an extension rearwardly of its tapered shaft in splined engagement with the sidewalls of a coaxial recess of the spindle that also extends rearwardly from the conically tapered opening of the spindle, whereby an unbroken outer cylindrical surface of the spindle at a location adjacent to and rearwardly of the rotatable collar may be provided and used for a spindle bearing support at said location.

Other objects of this invention will appear in the following description and appended claims, reference being had to the accompanying drawings forming a part of this specification wherein like reference characters designate corresponding parts in the several views.

THE PRIOR ART:

The following representations of the state of the art are U.S. Pat. Nos.: 3,380,746, Benjamin et al; 3,663,028, King, Jr. et al; 3,730,540, King, Jr. et al; 3,817,648, Miller.

The above noted patents illustrate the concept of a rotatable collar in screw threaded engagement with a power driven spindle in combination with a complex latch assembly involving radial lugs on a tool holding adapter for connecting the spindle and adapter in an operative relation whereby a conically tapered adapter shank is seated within a mating tapered recess in the spindle. The structures disclosed in the above patents are thus subject to the disadvantages that the present invention especially avoids. No prior art is known that employs a retention-rejection collar in screw threaded engagement with a tool holding adapter as described herein and rotatable but not axially movable on a power driven spindle for rapidly securing the adapter to the spindle at a seated operative position, or for disconnecting the adapter from the spindle, by essentially a single turn of the collar, and wherein the driving connection between the spindle and adapter is entirely independent from the means for securing the adapter at the operative position.

THE DRAWINGS

FIG. 1 is a fragmentary side elevational view partially in longitudinal mid-section of a power driven spindle and tool holding adapter embodying the present invention.

FIG. 2 is a view similar to FIG. 1, showing the adapter removed from the spindle.

FIG. 3 is a transverse sectional view taken in the direction of the arrows substantially along line 3—3 of FIG. 1.

FIG. 4 is a view similar to FIG. 2, showing a modification.

FIG. 5 is a transverse sectional view through the spindle, taken in the direction of the arrows substantially along the line 5—5 of FIG. 4.

FIG. 6 is a transverse sectional view through the adapter, taken in the direction of the arrows substantially along the line 6—6 of FIG. 2.

FIG. 7 is a view similar to FIG. 3, taken in the direction of the arrows substantially along the line 7—7 of FIG. 4.

It is to be understood that the invention is not limited in its application to the details of construction and arrangement of parts illustrated in the accompanying drawings, since the invention is capable of other embodiments and of being practices or carried out in various ways. The phraseology or terminology employed herein is for the purpose of describing the invention claimed in the appended claims.

DESCRIPTION OF A PREFERRED EMBODIMENT OF THE INVENTION

Referring to the drawings, a power driven rotatable hardened steel spindle 10 is illustrated that may be used as part of a conventional single spindle or multiple spindle machine for the mass production of various articles requiring drilling, reaming, grinding, and other operations involving a rotary tool. The forward end of the spindle 10 is provided with a coaxial cylindrical extension 11 of reduced diameter and a coaxial conically tapered forwardly opening recess 12 that opens rearwardly in a coaxial cylindrical recess 13. A diametrical pin 14 is confined within and extends diametrically through a hole 15 in the spindle 10 at the region of the recess 13.

A hardened steel tool-holding adapter 16 is provided at its forward or rightward end with a conventional chuck comprising a split collet and nut combination 17 gripping the coaxial shank of a drill 18 in the present instance. The collet and nut combination 17 may be conventional and illustrates merely by way of example one type of tool holding device that may be used with the present invention.

Rearwardly or leftward of the device 17, the tool holder 16 comprises a coaxial cylindrical enlargement 19 externally threaded at 20. Rearwardly of the enlargement 19, the tool holder 16 comprises a conically tapered shaft 21 dimensioned to mate coaxially with the recess 12 and terminating rearwardly in a coaxial cylindrical shaft extension 22 freely slidable into and out of the cylindrical recess 13. An axially extending diametrical slot 23 in the extension 22 opens rearwardly to receive the pin 14 and provide a spline type driving connection between the spindle 10 and adapter 16, FIG. 1.

A retention-rejection collar 24 freely rotatable on the reduced cylindrical extension 11 is retained against axial movement thereon by a retention ring 25 having outer and inner peripheral portions confined respectively within confronting annular grooves 26 and 27 in the inner periphery of the collar 24 and outer periphery of the cylindrical extension 11. The forward end of the collar 24 is internally threaded at 28 to cooperate with the external threads 20 of the adapter enlargement 19.

The outer periphery of the collar 24 may be knurled to facilitate manual manipulation and may be approximately the same diameter as the adjacent larger cylindrical body of the spindle 10. If desired, a pair of opposing flats may be provided on the outer periphery of the collar 24 for engagement by a tool to enable rotation of the collar 24 in situations where the spindle 10 is one of multiple spindles spaced too closely together for finger engagement.

In order to secure the tool holder at the operative position, FIG. 1, the cylindrical extension 22 is inserted into the tapered recess 12 and moved rearwardly into the recess 13 until it engages the pin 14. The adapter 16 may then be rotated until the slot 23 aligns with the pin 14 to enable additional rearward movement of the adapter 16 until the threads 20 engage the threads 28, at which position the pin 14 will be well received within the slot 23. Thereafter the collar 24 is rotated to move the adapter 16 leftward by screw action effected by the threaded engagement between the threads 20 and 28. Preferably these threads comprise an acme type thread dimensioned to move the conical shaft 21 leftward into coaxial seated engagement with the mating conical recess 12 upon no more than a single turn of the collar 24.

Inasmuch as the pin 14 within the slot 23 provides the driving connection between the spindle 10 and adapter 16, and the seated engagement between the conical portions 12 and 21 is required merely to assure coaxial alignment between the spindle 10 and adapter 16, said seating may be accomplished merely by finger pressure rotating the collar 24. The cylindrical shaft 22 is freely slidable within the cylindrical recess 13 but is also closely confined therein to enhance the coaxial support for the adapter 16 during operation. The direction of rotation of collar 24 required to seat the conical shaft 21 within the conical recess 12 will be opposite the direction of rotation of the spindle 10 during operation, so that operation of the assembly will maintain the collar 24 in the tightened position of FIG. 1. Because the adapter 16 and spindle 10 are both of hardened steel, no appreciable wedging action will take place between the conical surfaces 12 and 21. Thus loosening of the adapter 16 from the spindle 10 may also be readily accomplished by finger rotation of the collar 24 oppositely to the direction required for moving the adapter to the tightened condition.

In order to initially assemble the collar 24 and spindle 10, the retention ring 25 comprises a resilient C-ring that can be sprung apart by a suitable tool until its inner circumference fits over the cylindrical extension 11. The C-ring 25 will then be slid leftward until it overlies and snaps into the groove 27. Thereafter the collar 24 is sleeved leftward over the cylindrical extension 11 toward the retention ring 25. A suitable tool is employed to compress the C-ring 25 until its outer periphery is essentially flush with the outer periphery of the cylindrical extension 11, whereupon the collar 24 is moved leftward until its groove 26 overlies the compressed C-ring 25. The latter will then snap outwardly to its normal unstressed condition partially within each of the grooves 26 and 27. The inital assembly of the collar 24 on the extension 11 is facilitated by a chamfered inner peripheral portion 30 at the left end of the collar 24.

Although the mating conical surfaces 12 and 21 are preferred for holding the adapter 16 in its coaxial operating condition, other configurations having axial and radial components for maintaining the adapter 16 at a predetermined operative position with respect to the spindle 10 may be used. However replacement of the conical surfaces 21 and 12 by cylindrical surfaces, for example, would require precise dimensions for such surfaces. Also such closely interfitting cylindrical surfaces would render insertion and withdrawal of the cylindrical adapter shaft difficult. The mating conical surfaces 12 and 21 avoid these difficulties and enable relaxed radial and axial dimensions. It is only essential to provide uniform tapers for the surfaces 12 and 21 within readily obtainable close tolerances. In the latter regard, the dimensional tolerances are preferably selected so that the conical surface 21 seats coaxially within the recess 12 slightly before the reduced end of the surface 21 reaches the cylindrical recess 12.

The modification of the present invention illustrated in FIGS. 4–7 is essentially the same in structure and operation as the embodiment illustrated in FIGS. 1–3, except for details of the tool holding collet and the spline connection between the spindle and adapter. Accordingly the structure and operation of the parts in FIGS. 4–7 corresponding to parts described in regard to FIGS. 1–3 are not described in further detail below but are identified by the same numbers increased by a factor of ten.

The cylindrical extension 220 of the adapter 160 is provided with a pair of parallel and diametrically spaced flats 230, FIG. 6, in lieu of the slot 23 of FIG. 1, and a mating pair of sector flats 140 is provided as part of the sidewall of the otherwise cylindrical recess 130, in lieu of the pin 14. Thus when the conical portion 210 of the adapter 160 is inserted into the mating conical recess 120 of the spindle 100, and rotated to align the flats 230 and 140 in parallelism, the adapter 160 can be moved leftward, FIG. 4, until the conical surface 210 seats at its operative position against the mating conical surface 120.

The internal spline connection 140, 230 eliminates the pin 14 and enables the provision of an exterior cylindrical surface 150 of the spindle 100 adjacent to and rearwardly of the collar 240 for use as a bearing surface, or a surface for supporting a bearing, for the spindle 100 close to the tool holding adapter 160 where bearing support for the rotatable spindle is most effective for resisting radial loads tending to deflect the forward adapter supporting end of the spindle 100 from its desired coaxial operating condition.

The adapter 160 in FIG. 4 is provided with a coaxial bore internally threaded at its inner or leftward end 320 to receive a pre-set screw 330 notched at 340 for receiving the blade 350 of a tool, such as a drill bit 180. The forward or rightward end of the bore through the adapter 160 diverges conically outwardly at 370 for receiving a mating conically tapered collet 380. The latter is a longitudinally slotted tubular member adapted to be constricted firmly around the tool 180 when forced leftward into the conical opening or recess 370. A multiple spiral resiliently expandable spring ring 390 is adapted to seat within an annular groove 400 of the collet 380 and is engageable by the external or rightward face of an annular flange 410 of a nut 420 adapted to be screwed leftward on an outer end of the adapter 160 which is externally threaded at 430 at the region of the conical recess 370. The radial contraction of the collet 380 foret clamping the shank of tool 180 when the collet is forced leftward into the conical recess 370 upon tightening of the nut 420 on the threaded adapter portion 430 may be conventional and is described merely to illustrate a typical means for holding a rotatable tool 180.

In the above regard, the collet 380, nut 420, and spring ring 390 may be assembled as a unit prior to insertion of the collet into the tapered reess 370. The nut 420 may be moved leftward over the collet until the flange 410 seats on an annular step 415 of the collet 380 in abutment with an annular shoulder 416 that defines the leftward boundary of the step 415. Thereafter the spring ring 390 is expanded radially and moved over the right end of collet 380 until it overlies the groove 400, whereupon the ring 390 is released to seat within the groove 400. The outer periphery of the ring 390 within the groove 400 extends radially outwardly beyond the inner periphery of flange 410 to provide means for pulling the collet 380 from its seated operative position within the recess 370 when the nut 420 is unscrewed rightward from the threaded adapter portion 430.

To secure the tool 180 at its operative position, the pre-set screw 330 is screwed forwardly into the bore 320 to a predetermined location for engaging the blade 350 and limiting inward or leftward movement of the tool 180. The collet 380 with the assembled nut 420 and ring 390 are inserted into the conically tapered opening 370, the nut 420 is loosely screwed on the threaded end 430, the tool 180 is inserted through the nut 420 and collet 380 and aligned to seat its blade 350 within the notch 340, and the nut 420 is then screwed leftward on the threaded end 430 to force the collet 380 into the conical opening 370 by engagement between the flange 410 and shoulder 416. As the collet 380 is forced leftwrad, it is constricted radially by the conical recess 370 into an operative gripping engagement with the tool 180.

I claim:

1. The combination of a tool holding adapter, a power driven spindle having an axially extending endwise opening recess at one axial end, the adapter having an axial shaft dimensioned for insertion axially into said recess through the endwise opening, means for limiting said insertion at a predetermined operating position and for supporting said shaft coaxially with said spindle at said operating position comprising mating surfaces of said shaft and spindle engageable at said predetermined position for effecting a sealed closure for said opening, spline means on said spindle and adapter interengageable at said operating position for rotating said adapter coaxially with said spindle, an annular collar rotatable coaxially on a cylindrical surface of said spindle at said one end, means for retaining said collar against axial movement in either direction comprising a resilient retention ring having outer and inner peripheral portions closely confined within confronting grooves in said collar and spindle and, prior to assembly within said confronting grooves, being resiliently deformable radially to enable said assembly, and means for moving said adapter axially to and from said predetermined position and for forcing said engageable mating surfaces tightly together to increase the effectiveness of said sealed closure upon rotation of said collar comprising interengageable screw threaded means on said collar and adapter.

2. The combination according to claim 1, said screw threaded means comprising an internally threaded portion of said collar and an externally threaded portion of said adapter.

3. The combination according to claim 1, said collar comprising a one-ring annular collar, and said retention ring prior to assembly within said confronting grooves being resiliently deformable radially for extending around the cylindrical surface of said spindle on which said collar is rotatable and also for confinement entirely within the groove in said spindle to enable said assembly.

4. The combination according to claim 1, said recess comprising a coaxial conical recess converging axially inwardly from said one end, said shaft comprising a conical shaft insertable into said recess to said predetermined position and mating coaxially with the conical sidewalls of said recess when at said predetermined position, said collar having an interior cylindrical surface closely conforming to the contour of said cylindrical surface of said spindle on which said collar is rotatable, and said screw threaded means comprising a screw threaded surface of said collar interengageable with a screw threaded surface of said adapter.

5. The combination according to claim 4, said collar comprising a one-piece annular collar, and said retention ring prior to assembly within said confronting grooves being resiliently deformable radially for extending around the cylindrical surface of said spindle on which said collar is rotatable and also for confinement entirely within the groove in said spindle to enable said assembly.

6. The combination according to claim 5, said interengageable screw threaded surfaces comprising interior and exterior threaded surfaces respectively of said collar and adapter arranged to move said adapter toward said predetermined position to increase the effectiveness of said sealed closure upon rotation of said collar oppositely to the direction of power rotation of said spindle during operation.

7. The combination according to claim 6, said retention ring having parallel axially spaced surfaces normal to the axis of said spindle for resisting axial forces thereat resulting from operation of said collar, and said grooves having axially spaced sides parallel to and closely spaced by the sides of said retention ring.

8. The combination according to claim 7, said spindle having an unbroken exterior cylindrical surface portion adjacent to and axially inwardly from said collar for enabling a bearing support for said spindle immediately adjacent to said collar.

9. The combination according to claim 4, the reduced end of said conical shaft terminating in a coaxial endwise extending cylindrical shaft portion, the reduced end of said conical recess opening into a coaxial cylindrical recess dimensioned to receive said cylindrical shaft portion, the cylindrical wall of said cylindrical recess closely conforming coaxially to the cylindrical surface of said shaft portion in supporting relationship.

10. The combination according to claim 9, said spline means comprising a pin confined with said spindle and extending diametrically into said cylindrical recess, and a slot extending axialy in said cylindrical shaft portion, said slot being dimensioned to receive said pin upon axial movement of said adapter to said predetermined position.

11. The combination according to claim 4, said spindle having an unbroken exterior cylindrical surface portion adjacent to and axially inwardly from said collar and also having a cylindrical surface portion of reduced diameter with respect to said unbroken cylindrical surface, and said collar being rotatable on said reduced diameter portion and having an outer cylindrical surface essentially equal in diameter to the diameter of said unbroken cylindrical surface.

12. The combination according to claim 4, said spindle having an unbroken exterior cylindrical surface portion adjacent to and axially inwardly from said collar for enabling a bearing support for said spindle immmediately adjacent to said collar.

* * * * *

UNITED STATES PATENT AND TRADEMARK OFFICE
CERTIFICATE OF CORRECTION

PATENT NO. : 4,722,645
DATED : February 2, 1988
INVENTOR(S) : Donald J. Regan

It is certified that error appears in the above—identified patent and that said Letters Patent is hereby corrected as shown below:

Column 5, line 59, change "foret" to --for--.

Column 6, line 62, change "one-ring" to --one-piece--.

Signed and Sealed this

Nineteenth Day of July, 1988

*Attest:*

*Attesting Officer*

DONALD J. QUIGG

*Commissioner of Patents and Trademarks*